United States Patent [19]

Ware

[11] Patent Number: 5,580,185
[45] Date of Patent: Dec. 3, 1996

[54] OIL CONTAINMENT BOOM

[76] Inventor: Colon K. Ware, Rte. #4 Box 536, Murphy, N.C. 28906

[21] Appl. No.: 550,451

[22] Filed: Oct. 30, 1995

Related U.S. Application Data

[60] Provisional application No. 60/003,386, Sep. 7, 1995.
[51] Int. Cl.$^6$ ..................................................... E02B 15/04
[52] U.S. Cl. ................................. 405/72; 405/70; 405/63
[58] Field of Search ..................... 405/63–72; 210/242.3, 210/923

[56]  References Cited

U.S. PATENT DOCUMENTS

| | | | |
|---|---|---|---|
| 3,839,869 | 10/1974 | Green | 506/70 |
| 4,188,155 | 2/1980 | Langermann | 405/63 |
| 4,295,756 | 10/1981 | Blair | 405/70 |
| 4,422,797 | 12/1983 | McAllister et al. | 405/63 X |
| 4,781,493 | 11/1988 | Fischer | 405/63 |
| 4,802,791 | 1/1989 | Fisher et al. | 405/63 |

FOREIGN PATENT DOCUMENTS

| | | | |
|---|---|---|---|
| 7200529 | 7/1973 | Netherlands | 405/66 |
| 1568331 | 5/1980 | United Kingdom | 405/68 |

Primary Examiner—Dennis L. Taylor
Attorney, Agent, or Firm—Frank A. Lukasik

[57]  ABSTRACT

A system for containing and collecting oil spills and other water surface contaminants is provided. More specifically, the invention comprises a plurality of oil containment boom sections adapted to be coupled together, each section including a body fabric made of assorted polyester and nylon substrates and having spaced heat sealed areas therein, a flotation log of sealed spiral-wound air-bubble material, a ballast preferably made of sand sealed inside a polyester tubing, an upper hand-hold strength member preferably made of closed-cell polyethylene foam sealed at the top of the oil boom and containing a tension strap having a selected tensile strength, a hand-hold loop sewn to the body fabric to aid in handling an retrieval, and a vertical stiffener made of plastic or aluminum sealed in the boom to aid during top flotation and freeboarding conditions.

11 Claims, 5 Drawing Sheets

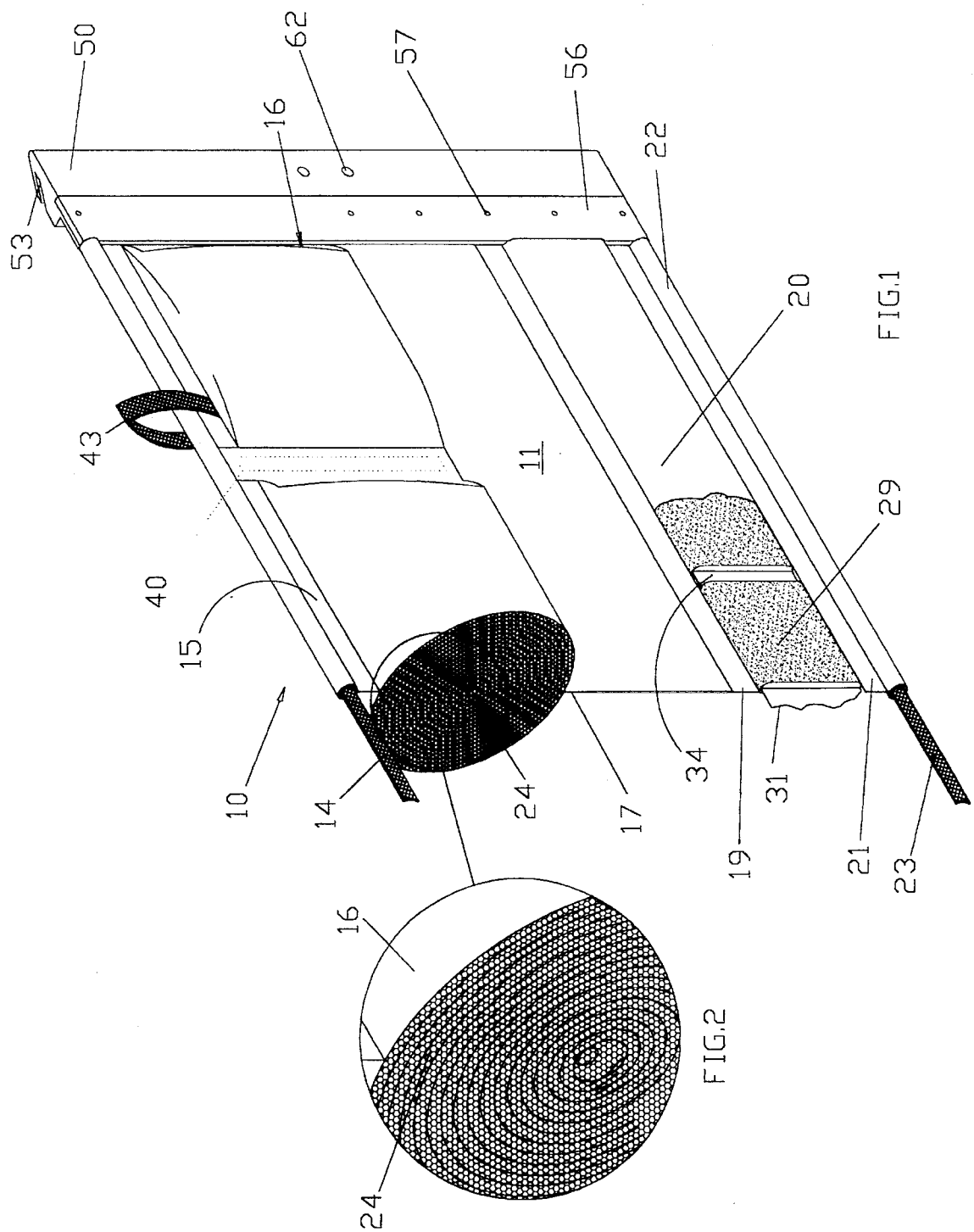

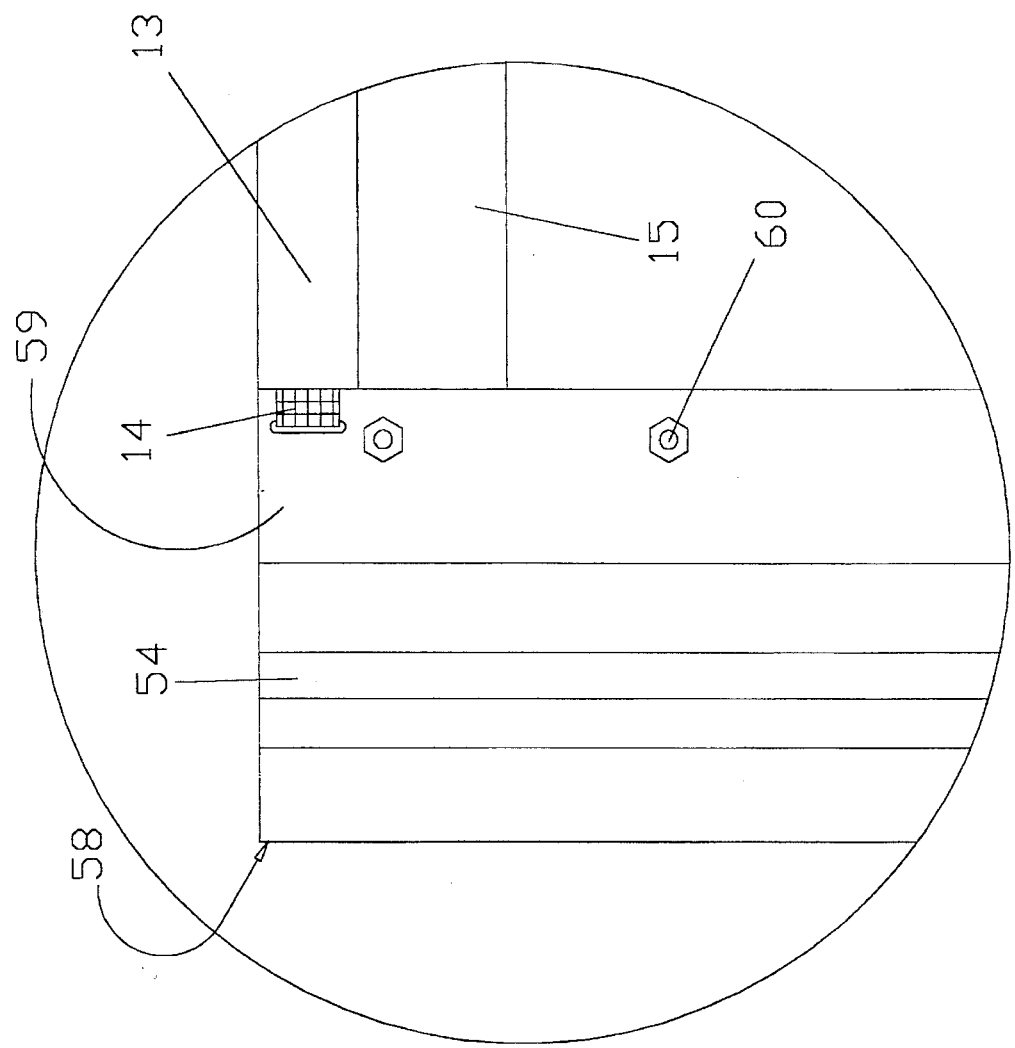

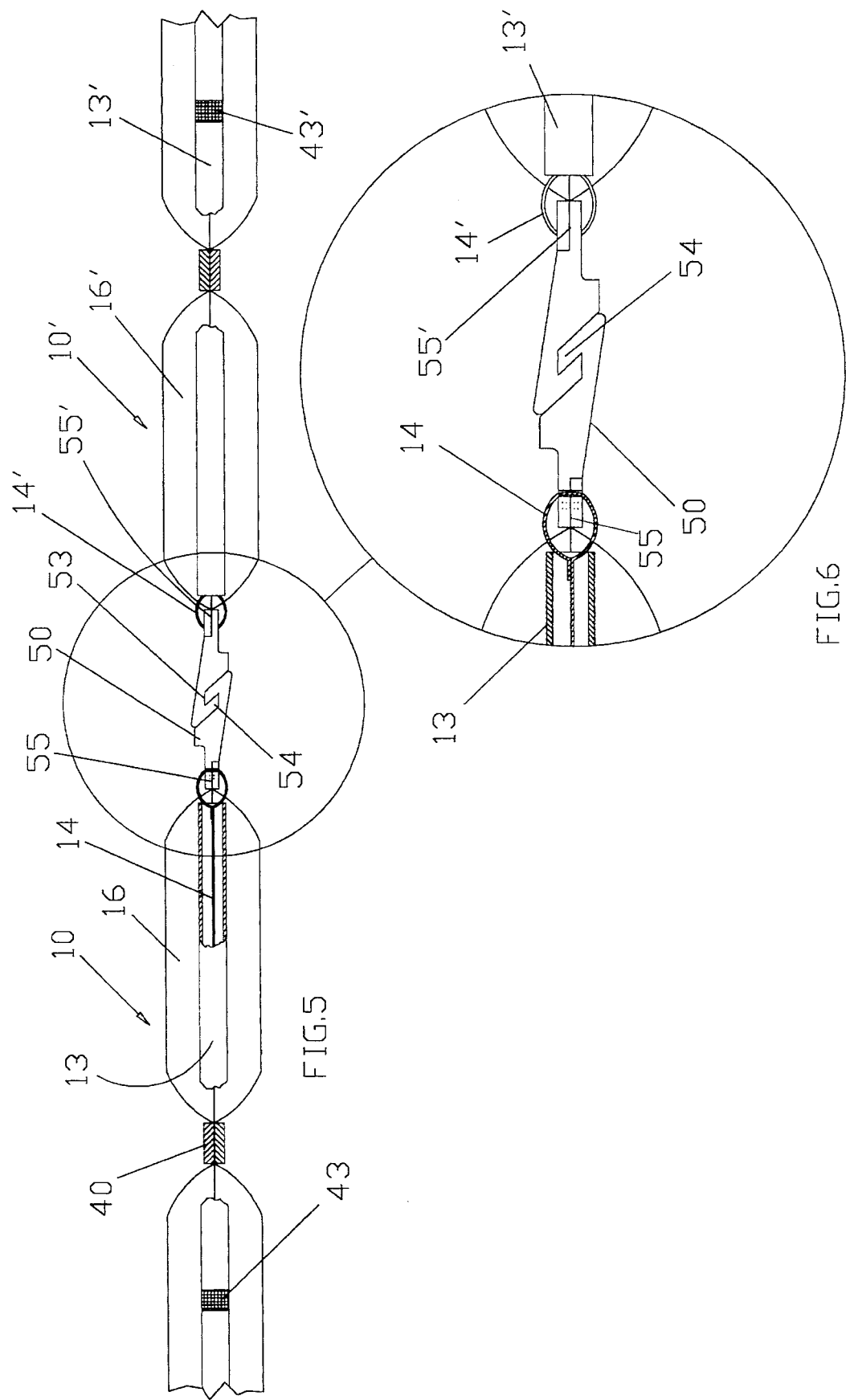

5,580,185

OIL CONTAINMENT BOOM

RELATED INVENTION

This application is a continuation-in-part of Provisional patent application Ser. No. 60/003,386 filed on Sep. 7, 1995.

BACKGROUND OF THE INVENTION

1. Field of the Invention

The invention relates generally to containment boom systems, and more particularly, to an improved oil containment boom made of a plurality of sections that are coupled together to from the boom. Each section comprises a body fabric made of assorted polyester and nylon substrates, in which is sealed in separate compartments, a flotation member containing a sealed spiral-wound air-bubble material, a ballast preferably made of sand sealed inside a polypropelene tubing, a tension means having a tensile strength on the order of 9,000 pounds, an upper hand-hold member preferably made of closed-cell polyurethane foam, and hand-hold strappings preferably made of nylon or polyester woven material. A stiffener, preferably made of plastic or aluminum, may be added in each section.

2. Description of the Prior Art

Containment booms for controlling and assisting in the collection of oil spills and other water surface contaminants have been in use for many years. For example, U.S. Pat. No. 3,919,847 to Ballu discloses a floating barrier which consists of a portion of a skirt material that is folded over and sealed at its upper end to form a series of compartments that are separated by vertically sealed strips on each side of the skirt material. An aperture is formed in each compartment along the top surface thereof, with a ring disposed therein to give each compartment its shape. Ring holders are positioned laterally opposite hooks, both of which are centrally positioned in each compartment so as to dispose each ring horizontally hooked in place. Folds created by the rings give each compartment flexibility, and chain is secured along the bottom of the skirt for ballast. Cylindrical blocks of low density material may be placed in each compartment to provide shaping thereof in lieu of the rings.

U.S. Pat. No. 4,244,819 to Ballu relates to floating anti-pollution barriers designed to catch bodies of substances floating on the surface of the Water. The flotation means in these barriers consist of a series of pockets formed by a series of welded or bonded strips, with the pockets open at their lower end to allow the insertion therein of masses of cellular watertight material or bladders filled with air. A sheet of fabric is folded along its length to form two equal major portions, allowing the admittance of water and inserts into the pockets. The free bottom edges are joined together by spaced rings which also support a chain that serves as a load or ballast.

U.S. Pat. No. 5,074,709 to Stensland relates to an elongated floating boom device for containing spilled fluids such as crude oil. A continuous sheet of a plastic material is folded along its longitudinal axis to form opposed wall surfaces of substantially equal height which surfaces are divided at their top extremity into a plurality of vertical flotation sections that are sealed along their lower extremities. Each section is then pumped full of air after which the sections are sealed along their upper extremities. A lower weighted sealed section contains a ballast such as sand in a fold of the fabric sheet.

U.S. Pat. No. 5,374,133 to Lazes et al concerns a high-temperature resistant inflatable oil containment boom formed of a fluid-impervious material and having a protective cover that extends substantially the full length of the boom. The boom is an elongated inflatable tube is divided into compartments along its length by transverse heat sealed strips or by spaced bulkheads. The compartments are inflated through individual tubes having check valves therein. A skirt is secured along the lower portion of the elongated tube, and a chain or other ballast is enclosed in a sealed lower compartment of the skirt. The protective cover consists of several layers of high-temperature resistant materials which are made unitary by having at least the top and bottom layers secured together along their peripheral edges.

It can be readily appreciated that these references, either singly or in combination, do not suggest or infer the oil containment boom of the present invention which provides for, in the preferred embodiment, a plurality of sections each including a body fabric made of assorted polyester and nylon woven substrates, a flotation log of sealed spiral-wound air-bubble material, a sand ballast sealed inside a polyester tubing, a tension strap having a selected tensile strength and contained in an upper hand-hold gripping member sealed at the top of the oil boom, hand-hold loops sewn along the gripping member to aid in handling and retrieval, a vertical stiffener sealed across the log, and spaced heat sealed areas in the body fabric.

Reviewing the cited patents, in Ballu '847, each compartment requires an aperture along its top side to provide access to either hook the rings in place or allow cylindrical blocks to be inserted therein. In Ballu '819, the pockets are formed in the top of the folded skirt, leaving the bottom thereof open to admit water or allow the insertion of masses of material or sealed bladders filled with water thereinto. In addition, the free bottom edges are bound together by spaced rings which also support a chain that serves as a load or ballast. Thus, as shown and taught, neither Ballu reference teaches, suggests nor anticipates the present invention. The vertical flotation sections of Stensland and the protective cover and air-filled compartments of Lazes, among other features, also distinguish the present invention over these references.

SUMMARY OF THE INVENTION

Accordingly, it is an object of the present invention to provide an improved system for containing floating wastes wherein a rupture of an air-bubble supported flotation member will cause only an insignificant loss of the confined supporting air.

It is another object of the invention to provide such a system in which all operative components are sealed in individual compartments in a single, folded sheet of fabric.

It is a still further object of the invention to provide such a system wherein the flotation boom is formed of sections that are secured together by improved coupling means.

It is yet another object of the invention to provide such a system wherein the addition of stiffeners to the flotation means will not result in undesirable distortion of the flotation means.

It is yet a further object of the invention to provide such a system wherein tensioning means are sealed within the body fabric at the vertical extremes thereof to provide for improved control and hauling in of a containment boom.

The foregoing objects are realized by the present invention in a system wherein the encompassing body fabric in each of a plurality of flotation sections is made of assorted polyester and nylon woven substrates coated with various forms and weights of vinyl geomembranes and urethane in various weights per square inch, the flotation log is formed of sealed, spiral-bound air-bubble material that may be tightly wound in various sizes and then sealed across the body fabric and on its ends so liquids cannot enter, a ballast preferably sealed at selected distances for different weight requirements, an upper tension strap having a tensile strength on the order of 9,800 pounds for handling and controlling the boom, an upper hand-hold polyester webbing preferably made of closed-cell polyethylene foam sealed at the top of the boom to aid in maneuvering the boom, a similar lower tension strap for ballast protection and handling and retrieval, and hand-hold strappings spaced along the top of the boom in loop form to aid in handling and retrieval. At least one stiffener in each section are preferably made of plastic or aluminum and sealed vertically between the logs may be added for aid in top flotation and freeboarding conditions. Improved couplers are provided for connecting the individual sections to form a complete barrier.

BRIEF DESCRIPTION OF THE DRAWINGS

The foregoing and further objects of the invention will become apparent from reading the following detailed description of the preferred embodiment thereof, in which:

FIG. 1 is a perspective view of the operative components of one flotation section of the invention.

FIG. 2 is an exploded view of one end of the flotation means shown in FIG. 1.

FIG. 4 is an exploded view of a portion of the section shown in FIG. 3.

FIG. 5 is a plan view of two adjoining sections of the invention linked together.

FIG. 6 is an exploded view of the linkage shown in FIG. 5.

DETAILED DESCRIPTION OF THE INVENTION

Figure 3:
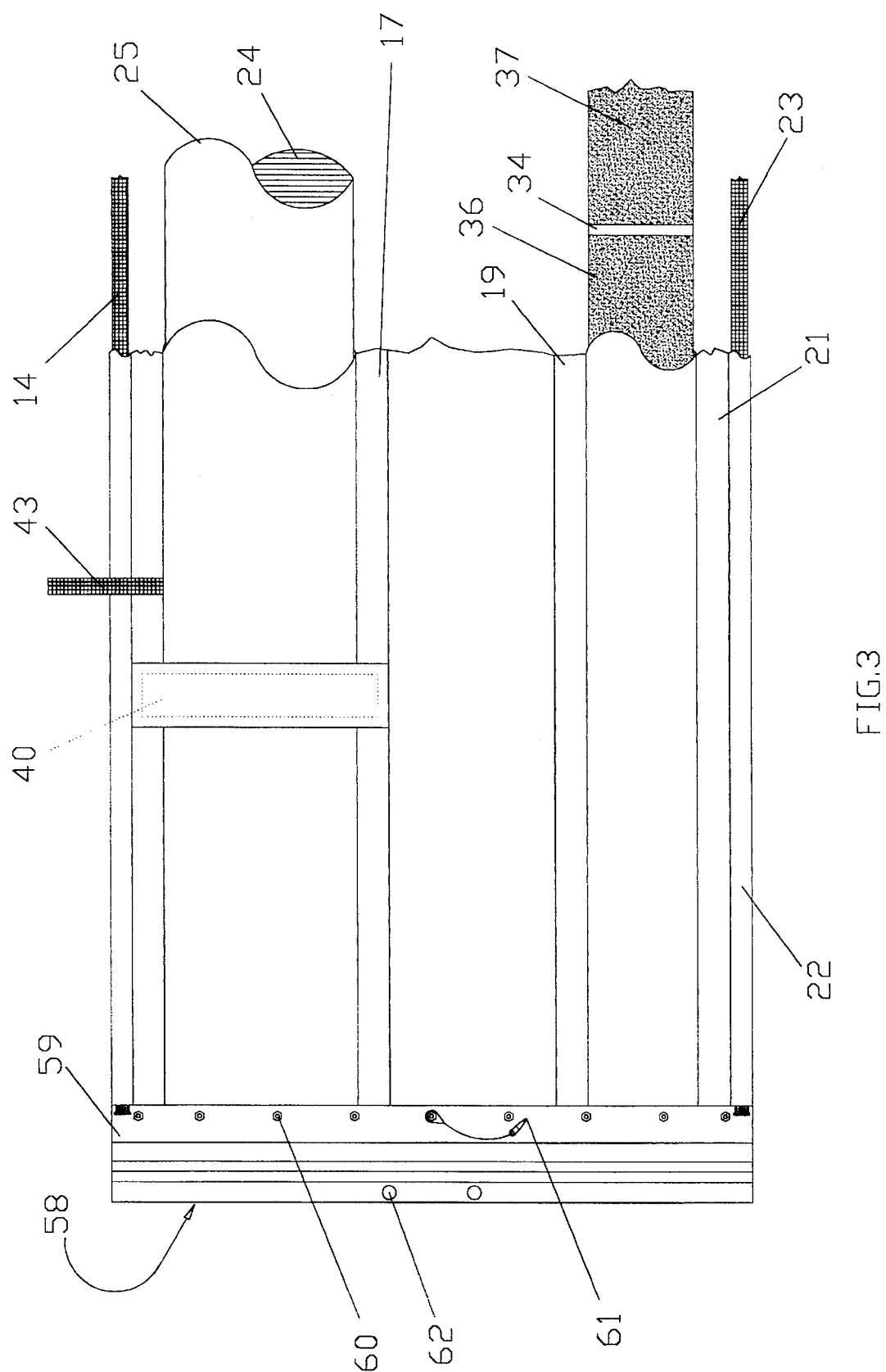
FIG. 3 is a side elevation partly cut away of a section of the invention adjoining the section shown in FIG. 1.

Turning now to FIGS. 1–3 of the drawings, there is shown a preferred embodiment of the invention 10 comprising a body fabric 11 which is formed over and sealed over various components that include a polyethylene tubing 13 enclosing an upper polyester webbing 14 that is separated by a heat sealed area 15, a flotation log 16 that is confined between area 15 and a heat sealed area 17, a skirt 18 that is confined between area 17 and a heat sealed area 19, a ballast compartment 20 that is confined between area 19 and a heat sealed area 21, and a lower polyethylene tubing 22 enclosing a lower polyester webbing 23. Flotation log 16 comprises a roll of spiral-wound air-bubble material 24 such as is available from Sealed Air Products, Fair Lawn, N.J., that is sealed inside a commercially available water-proof film 25 to prevent waterlogging.

A ballast of sand 29 is sealed inside a polyester tubing 31. The sand ballast is cross-sealed as indicated at 34 to form a plurality of sections, only two of which are shown at 36 and 37, to limit the loss of sand in the event one or more sections are ruptured. A stiffener 40, made of plastic or aluminum, may be sealed vertically in the boom to aid during top flotation and freeboarding conditions, Tubing 13 serves as a hand grip to aid in handling of the boom, while a hand-hold strap 43 is sewn or grommeted along the top of the boom in loop form to help in handling and retrieval. Coupling of the sections is effected through a section connector 50 having a slot or groove 53 therein that mates with a tongue 54, shown in FIGS. 5 and 6, for coupling with the adjoining section. A sealed edge 55, shown in FIGS. 5 and 6, of body fabric 11 is secured to section connector 50 by a clamp plate 56 and bolts, shown in FIG. 3, inserted through a plurality of blot holes 57. FIG. 3 also illustrates an adjoining section 10' having a mating section connector 58 and a clamp plate 59, with plate 59 showing of bolts and lock nuts 60 for clamping plate 59 to connector 58. At least a pair of locking pins 61 are inserted through a matching number of locking pin holes 62 to assure the integrity of the boom 10 by connecting one section to its adjoining section.

Figure 7:
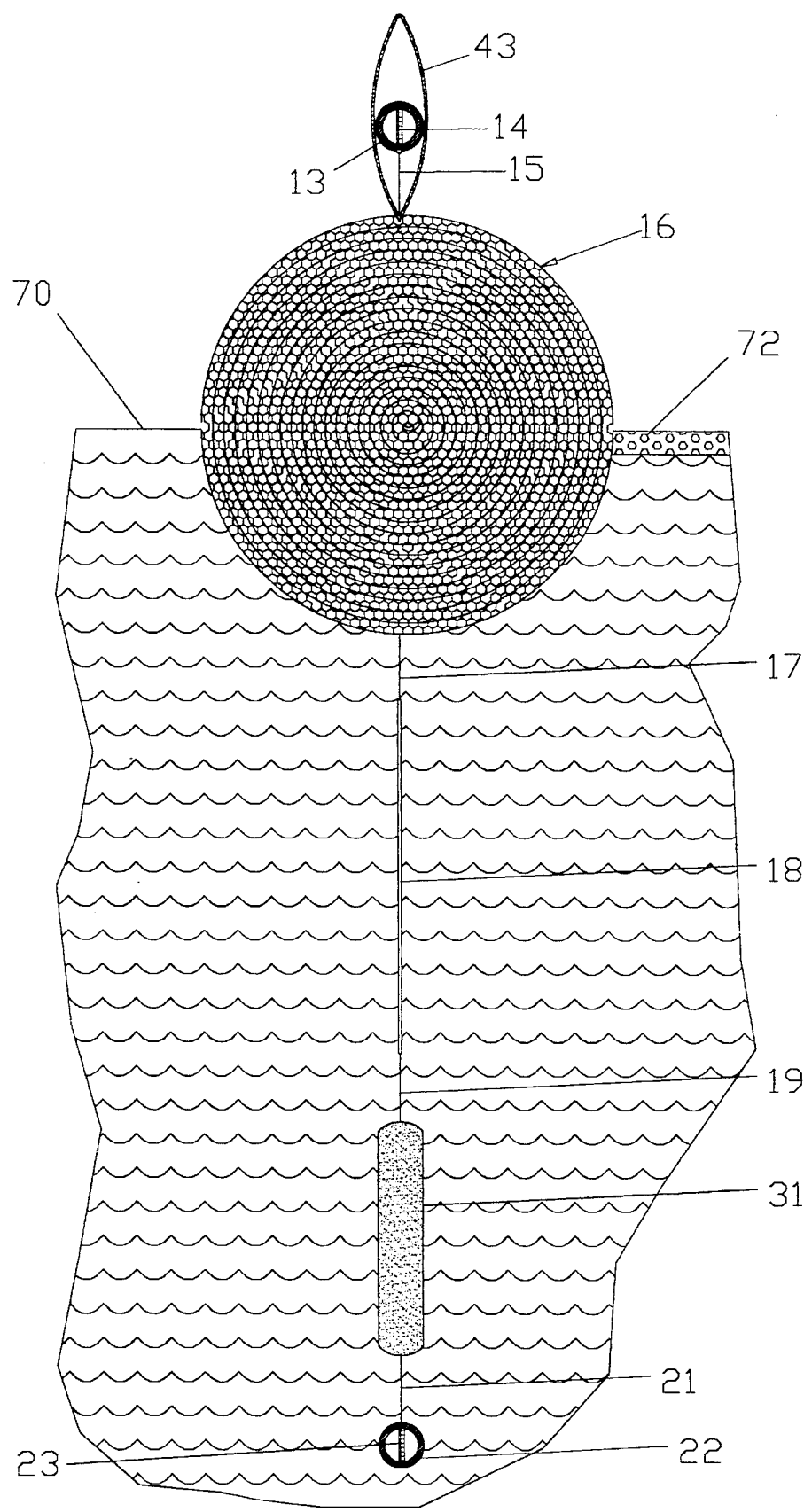
FIG. 7 is a schematic end elevation of the operative components of the invention in situ.

In FIG. 4, the upper left corner of the view in FIG. 3 is shown illustrating clamp bolts 58, heat sealed area 15, webbing 14, polyethylene tubing 13, and tongue 54. FIGS. 5 and 6 show the connection of two adjoining sections 10, and a mirror section 10' thereof. Log 16 is sealed at its ends between heat sealed areas 15 and 17. Opposing section 10' is shown linked with section 10, and comparable components of section 10' are indicated by prime numbers that correspond to the numbers of related components of section 10. In FIG. 7, the invention 10 is shown afloat in a body of water 70 on which an oil film 72 is contained by log 16.

Although this invention has been disclosed and described generally in relation to a preferred embodiment, its principles are susceptible of other applications which will become apparent to persons skilled in the art. Accordingly, many modifications, additions, and deletions may be made to the invention without departing from the scope of the invention as set forth in the following claims:

What is claimed is:

1. A system for containing oil and other water surface contaminants comprising:

a plurality of boom sections and means coupling said boom sections together, each boom section formed of a once folded outer body fabric, a plurality of spaced heat areas joining both folds of said body fabric and extending longitudinally along said boom sections, a first polyethylene tubing uppermost in said boom sections for handling the containment boom, a flotation log disposed below said first polyethylene tubing for waterborne support and a first heat sealed area interposed between said first polyethylene tubing and said flotation log, a skirt below said flotation log and a second heat sealed area interposed between said flotation log and said skirt, a ballast means below said skirt and a third heat sealed are interposed between said skirt and said ballast means, a second polyethylene tubing below said ballast means and a fourth heat sealed area interposed between said ballast means and said second polyethylene tubing, a heat sealed area formed along each side edge of said body fabric, a first coupling means fastened to said heat sealed area on one side edge of each boom section and a second coupling means fastened to said heat sealed area on the other side edge of each boom section for coupling together adjoining boom sections, and means for locking together a series of said first coupling means and said second coupling means to form an integrated containment boom.

2. The system as defined in claim 1 and further including a tension strap made of polyester webbing coaxially installed in said first and second polyethylene tubings for added strength in handling, maneuvering and retrieving said containment boom.

3. The system as defined in claim 2 wherein said body fabric is formed of polyester substrates coated with geomembranes and urethane.

4. The system as defined in claim 3 wherein said flotation log includes a spiral-wound sheet of air-bubble plastic material and a waterproof film enclosing said plastic material to prevent waterlogging.

5. The system as defined in claim 4 wherein said ballast means includes a sand ballast sealed inside an elongate waterproof polyester tubing, said tubing including a plurality of sections formed by cross-sealing to substantially reduce loss of sand in the event of puncture of individual sections.

6. The system as defined in claim 5 wherein said coupling means include a connector plate and a clamp plate associated therewith for securing therebetween said side edge heat sealed areas.

7. The system as defined in claim 6 wherein said first coupling means include a vertical groove extending along said one side edge thereof and said second coupling means include a vertical tongue extending along other side edge thereof, said groove and said tongue adapted for close engagement with cooperating components thereof in other of said boom sections when assembled in a containment boom.

8. The system as defined in claim 7 and further including at least one stiffener sealed vertically between the flotation log in each boom section intermediate the side edges thereof to provide additional freeboard and a comfortable hand hold, said stiffeners sealed inside said body fabric at said first and second heat sealed areas.

9. An oil containment boom comprising:

a plurality of boom sections adapted to be coupled together to form a unitary structure, each boom section formed of a once folded polyester and nylon woven substrate body fabric encompassing therewithin an upper tension strap for maneuvering and retrieving the boom, a flotation member for buoyancy, a ballast means for stability, and a lower tension strap for additional strength in towing and retrieval of the containment boom, said flotation member formed of sealed spiral-wound air-bubble material which may be tightly wound in selected sizes and then heat sealed across the body fabric and on the ends so that liquids cannot enter, said ballast means contained in a polyester tubing adapted to be sealed at selected distances for selected weight requirements, said upper tension strap formed of closed-dell polyethylene foam and sealed at the top of each boom section to aid in handling the containment boom, and means fastened to respective side edges of each body section for connecting together the body sections, said fastening means including mutually engaging tongue and groove connector plates so that a series of body sections may be joined to form a containment boom.

10. The containment boom as defined in claim 9 wherein said folded body fabric has a plurality of longitudinally extending heat sealed areas for longitudinal strengthening of the containment boom, a coupling means including vertically extending heat sealed areas along the side edges of said body fabric for clamping within a connector assembly, and a connector assembly including a first connector plate at one side of said body fabric and having a vertically extending groove therein and a second connector plate at the opposed side edge of said body fabric and having a vertically extending tongue adapted for close fit in said groove, a first clamp plate clamping said heat sealed area on said one side of said body fabric between said clamp plate and said first connector plate and a second clamp plate clamping said heat sealed area of said other side edge of said body fabric between said second clamp plate and said second connector plate, whereby said body sections may be securely joined together.

11. The oil containment boom as defined in claim 10 and further including at least one vertical stiffener made of aluminum, said stiffener heat sealed in plastic between said flotation log in each boom section intermediate the side edges thereof to provide additional freeboard and a comfortable hand hold, said stiffener sealed inside said body fabric at said first and second heat sealed area.

* * * * *